(12) United States Patent
Ahn et al.

(10) Patent No.: US 7,842,888 B2
(45) Date of Patent: Nov. 30, 2010

(54) FINISHING TOOL FOR CABLE MOLD CONNECTION

(76) Inventors: Moon-Sang Ahn, 201 Namcheon Yeonlib, 53-5 Gamcheon 1-dong, Saha-gu, Busan 604-802 (KR); Kyu-Jeong Chae, 345-7, Yeonsan-8dong, Yeonje-gu, Busan 611-816 (KR)

( * ) Notice: Subject to any disclaimer, the term of this patent is extended or adjusted under 35 U.S.C. 154(b) by 0 days.

(21) Appl. No.: 12/636,282

(22) Filed: Dec. 11, 2009

(65) Prior Publication Data

US 2010/0089634 A1    Apr. 15, 2010

Related U.S. Application Data

(63) Continuation of application No. PCT/KR2008/003293, filed on Jun. 12, 2008.

(30) Foreign Application Priority Data

Jun. 13, 2007    (KR) .................. 10-2007-0057721

(51) Int. Cl.
    *H02G 3/08* (2006.01)
(52) U.S. Cl. .................. 174/504; 174/95; 174/97; 174/101; 174/72 A; 174/68.1; 138/157; 439/892

(58) Field of Classification Search .................. 174/504, 174/95, 101, 97, 72 A, 68.1, 68.3, 72 R, 72 C; 439/892; 138/157, 92, 162; 248/68.1
See application file for complete search history.

(56) References Cited

U.S. PATENT DOCUMENTS

| 3,784,042 | A | * | 1/1974 | Hadfield et al. ............... 220/3.3 |
| 5,134,250 | A | * | 7/1992 | Caveney et al. ............. 174/101 |
| 5,704,175 | A | * | 1/1998 | Lewis ......................... 174/504 |
| 5,732,747 | A | * | 3/1998 | Holliday ..................... 138/163 |
| 5,942,724 | A | * | 8/1999 | Russo et al. ................. 174/481 |
| 6,274,814 | B1 | * | 8/2001 | Iavarone ..................... 174/68.3 |
| 6,523,791 | B2 | * | 2/2003 | Bernard et al. ............. 248/68.1 |

* cited by examiner

*Primary Examiner*—Dhiru R Patel
(74) *Attorney, Agent, or Firm*—Park & Associates IP Law LLC

(57) ABSTRACT

The present invention relates to a finishing tool for a cable mold connection. The finishing tool includes a connection base, a connection cover, and a plurality of couplers. The connection base has a thickness corresponding to the base and has at least two acceptance openings. The connection cover is coupled to an upper side of the connection base and finishes a connection with a corresponding end of at least two cable molds. The couplers are each provided at an upper side of the connection base and a lower side of the connection cover. A base of a cable mold is mounted in the acceptance opening.

14 Claims, 11 Drawing Sheets

100

(a)

(b)

(a)

(b)

FINISHING TOOL FOR CABLE MOLD CONNECTION

REFERENCE TO RELATED APPLICATIONS

This is a continuation of pending International Patent Application PCT/KR2008/003293 filed on Jun. 12, 2008, which designates the United States and claims priority of Korean Patent Application No. 10-2007-0057721 filed on Jun. 13, 2007, the entire contents of which are incorporated herein by reference.

FIELD OF THE INVENTION

The present invention relates to a finishing tool for a cable mold connection. More particularly, the present invention relates to a finishing tool for a cable mold connection, which is configured to include a connection base with an acceptance opening, a connection cover with a finishing groove, and a coupler and couple a mold coupling opening, which is formed by the acceptance opening and the finishing groove, with a cable mold end, thus making more firm and clean arrangement of a cable and a cable mold possible.

BACKGROUND OF THE INVENTION

In general, a cable mold includes a lower support plate 11 and an upper cover 12 as shown in FIG. 1A. The support plate 11 includes an elastic fragment 11a and a protrusion part 11b at both sides. Catching parts 12a are provided at both sides of the cover 12 to be insertable between the elastic fragment 11a and the protrusion part 11b.

In addition to the cable mold, as shown in FIG. 1B, the "WIRE PROTECTION MOLD" of Korean Utility Model Application No. 20-1998-0021578 includes a substrate 1 that is a bottom surface, both side flanges 2 and 3 that are both sidewalls, a cover 4 covering between the both side flanges 2 and 3, a thin part 5 increasing the rotatability of the cover 4 between the one side flange 2 and the cover 4 and the like.

In FIG. 1B, non-described symbols 1a, 3b, 4b, and 6 denote a double adhesive tape, a fitting groove, a fitting protrusion, and a wire, respectively.

However, the above-constructed cable mold cannot help exposing a built-in wire or cable to the external because it is impossible to finish regions where a plurality of cable molds are intersected or bent in a '⌐', " ⊢ ", or '+' shape. Therefore, the cable mold involves the danger of electric leakage or accident caused by peeling off of a sheath and the like.

As a solution to the above problems, the "LINE OR PIPE PROTECTOR" of Japanese Utility Model Registration No. 015396 (hereinafter, referred to as "prior art 1") provides a relationship between each cover (C') finishing a base support (B') and an assistance cover (D') coupled with the cover (C') to protect a cable (A) exposed at a region where protectors each including a base support (B') and a cover (C') finishing the base support (B') meet at their ends at right angles as shown in FIG. 2A.

In the prior art 1, as shown in FIG. 2B, a coupling plate 2 formed on a base 1 of a base support ($B_1$) and a cover ($C_1$) having a catching groove 8 outside are coupled with each other, thus forming a cable mold. A catching protrusion 11 provided inside an assistance cover ($D_1$) is coupled to the catching groove 8, thus achieving finishing.

Also, to finish a region where cables are intersected or bent in a ' ⊢ 'or '+' shape in addition to a ⌐ shape of the prior art 1, there can be provided the "CONNECTOR FOR NON-LINEAR CABLE MOLD CONNECTION" of Korean Utility Model Registration No. 20-0273473 (hereinafter, referred to as "prior art 2").

As shown in FIG. 3A, the prior art 2 can apply exemplary embodiments such as a square-shaped cover type non-linear connection connector 8 having an internal space 6 for cable protection, a T-shaped cover type non-linear connection connector 9, and a cross-shaped cover type non-linear connection connector 10.

As shown in FIG. 3B, the prior art 2 can also apply exemplary embodiments such as a two-piece square-shaped connector 39, a three-piece T-shaped connector 40, and a four-piece cross-shaped connector 41.

However, there is a problem that the prior arts cannot be used for other than a specified cable mold.

That is, the prior art 1 cannot take widespread countermeasures against a cable mold of a different type not having a catching groove 8 outside a cover ($C_1$), in such a manner that an adhesive has to be coated on the assistance cover ($D_1$) for finishing and construction or a catching protrusion 11 has to be cut away for construction.

Also, like the prior art 1, the prior art 2 cannot be used for other than a specified cable mold. In addition to this, it is an obvious fact that, as shown in FIG. 3B, disintegrating into a plurality of pieces for execution itself undoubtedly has a difficulty in clean cable finishing along with troublesomeness on a process and unavoidably greatly increases a construction time.

SUMMARY OF THE INVENTION

Accordingly, the present invention is directed to a finishing tool for a cable mold connection that substantially obviates one or more of the problems due to limitations and disadvantages of the related art.

An object of the present invention is to provide a finishing tool for a cable mold connection, for making more firm and clean arrangement of a cable and a cable mold possible.

Another object of the present invention is to provide a finishing tool for a cable mold connection, for simply, conveniently, and promptly executing a series of constructions inclusive of attachment and installation irrespective of proficiency.

To achieve these and other advantages and in accordance with the purpose of the present invention, as embodied and broadly described, there is provided a finishing tool for a cable mold connection, for connecting respective ends of cable molds with each other in a cable direction, the cable mold having a base for mounting a cable such as a phone line and the like and attached to the ground or a wall surface and a cover for protecting the cable and finishing the base. The finishing tool includes a connection base, a connection cover, and a plurality of couplers. The connection base has a thickness corresponding to the base and has at least two acceptance openings formed through cutaway along a cable direction of the cable mold. The connection cover is coupled to an upper side of the connection base, has a finishing groove corresponding to an outer shape of a cover of the cable mold, and finishes a connection formed by ends of at least two cable molds. The plurality of couplers are each provided at an upper side of the connection base and a lower side of the connection cover and couple the connection base and the connection cover with each other. The base of the cable mold is mounted in the acceptance opening.

According to the present invention, there is provided a finishing tool for a cable mold connection, for connecting respective ends of cable molds with each other in a cable direction, the cable mold having a base for mounting a cable such as a phone line and the like and attached to the ground or a wall surface and a cover for protecting the cable and finishing the base. The finishing tool includes a connection base, a connection cover, and a plurality of couplers. The connection base has a thickness corresponding to the base and has at least two acceptance openings formed through cutaway along a cable direction of the cable mold. The connection cover is coupled to an upper side of the connection base, has a finishing groove 104' corresponding to an outer shape of a cover 14 of the cable mold, and finishes a connection formed by ends of at least two cable molds. The plurality of couplers 106 are each provided at an upper side of the connection base and a lower side of the connection cover and couple the connection base and the connection cover with each other. The base of the cable mold is mounted in the acceptance opening.

DETAILED DESCRIPTION OF THE INVENTION

Figure 1:
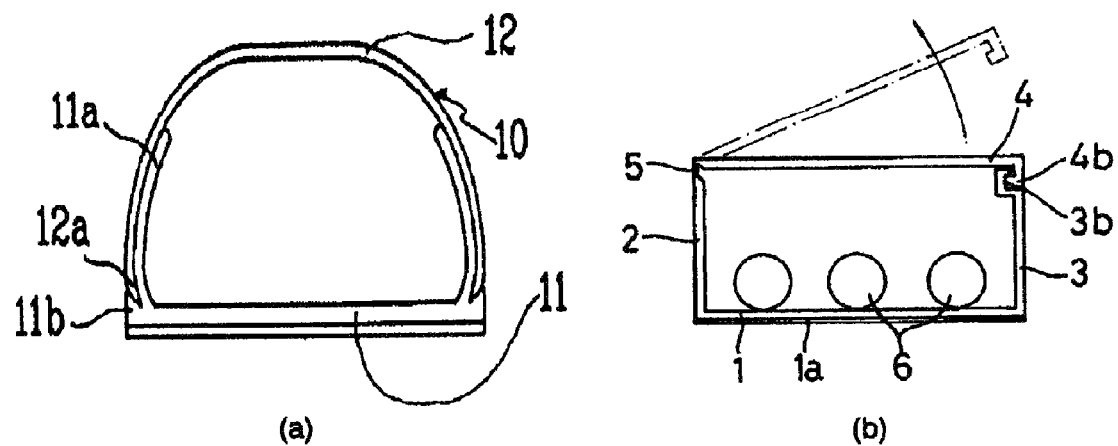
FIG. 1 is a conceptual diagram illustrating various exemplary embodiments of a general cable mold.
Figure 2:
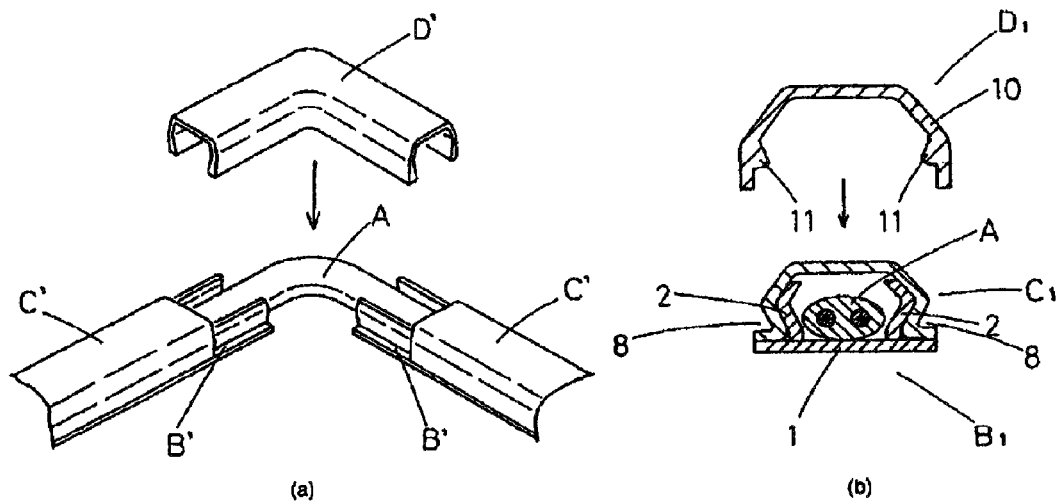
FIGS. 2 and 3 are conceptual diagrams illustrating a construction of a finishing tool for a cable mold connection according to the conventional art.
Figure 3:
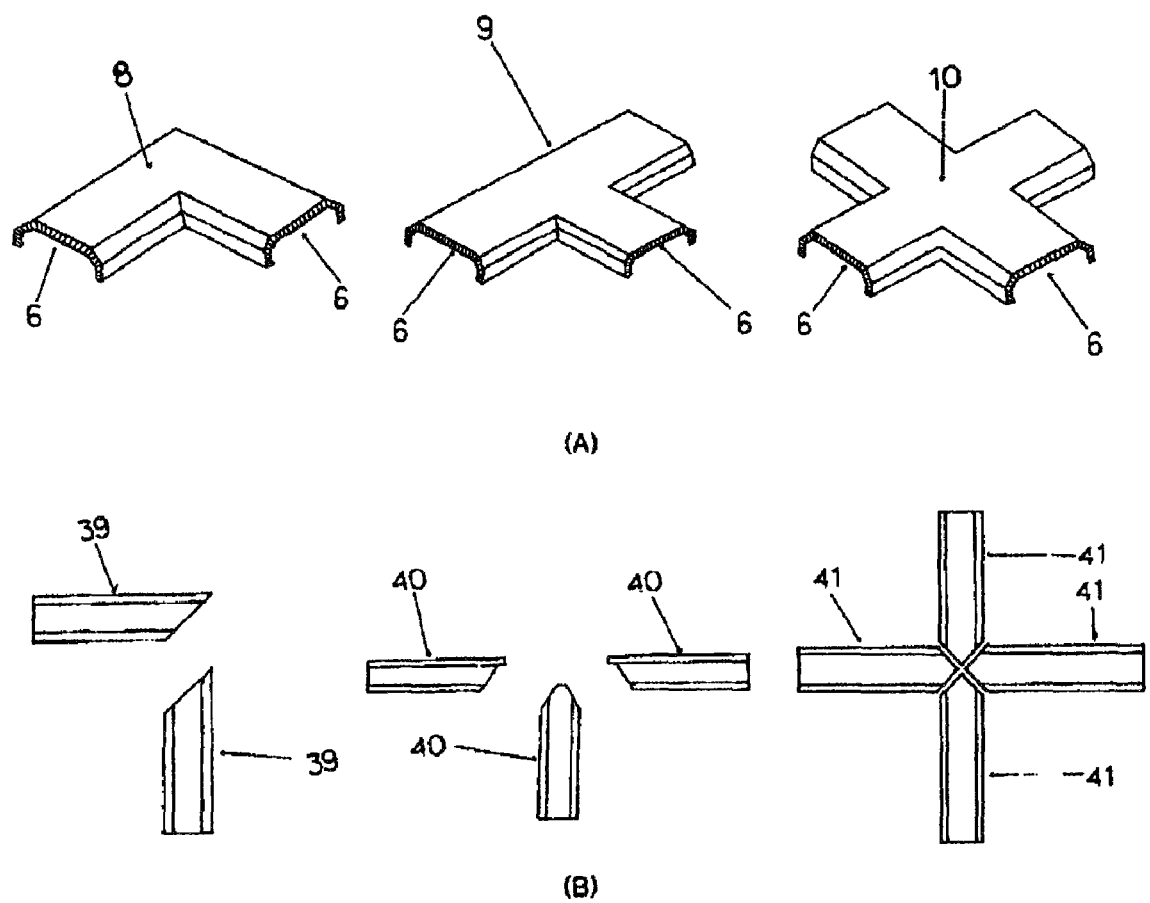

Hereinafter, exemplary embodiments of the present invention will be described in detail with reference to accompanying drawings.

FIGS. 4 to 9 are perspective diagrams and exploded perspective diagrams illustrating various exemplary embodiments of a cable mold finishing tool according to the present invention. As shown, the cable mold finishing tool 100 according to the present invention chiefly includes a connection base 102, a connection cover 104, and a coupler 106.

The finishing tool 100 connects and finishes respective ends of cable molds 10 along a cable direction. The cable mold 10 includes a base 12 mounting a cable (not shown) such as a phone line and the like and attached to the ground or a wall surface, and a cover 14 for protecting the cable and finishing the base 12.

Figure 4:
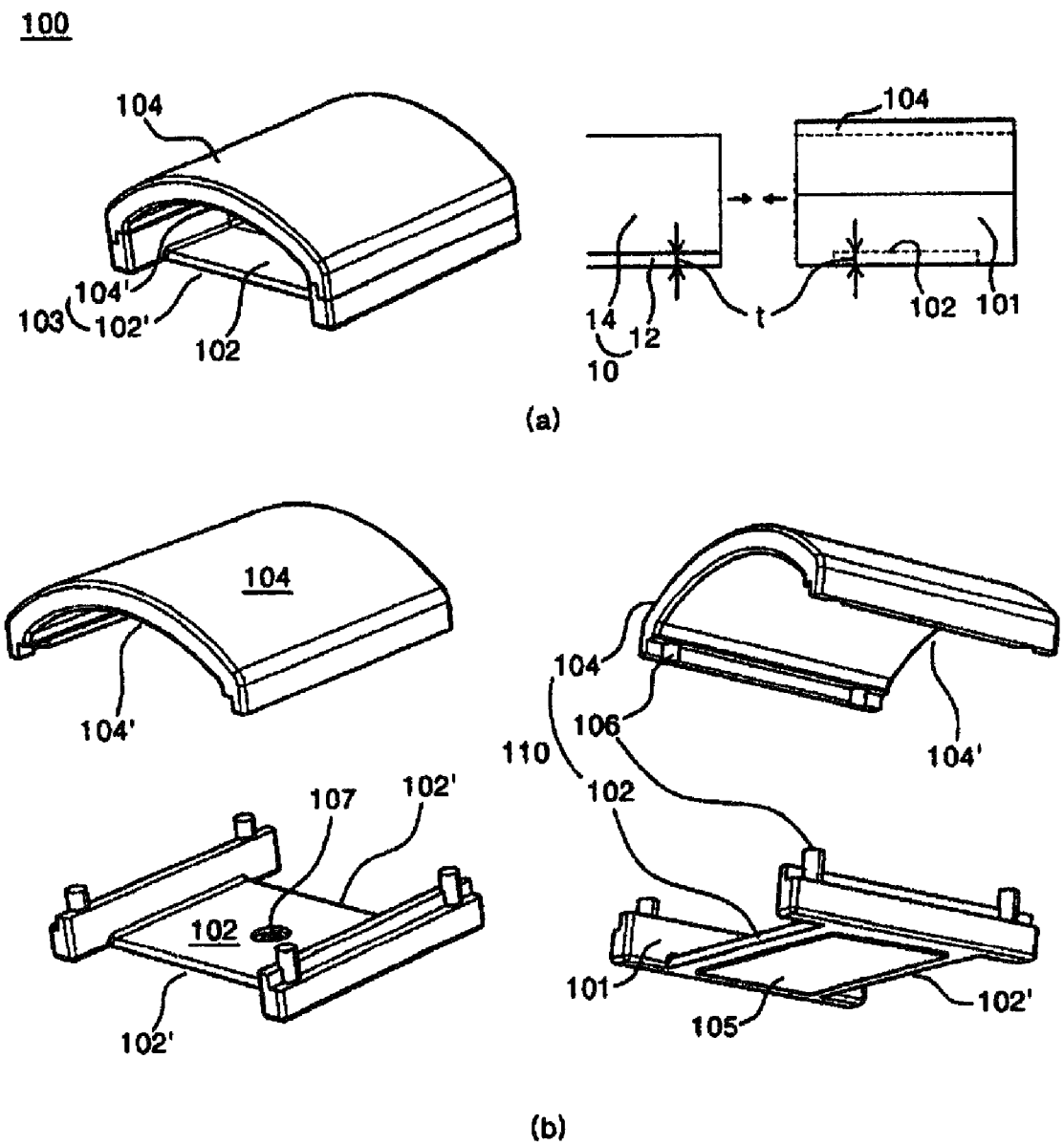
FIGS. 4 to 9 are perspective diagrams and exploded perspective diagrams illustrating various exemplary embodiments of a cable mold finishing tool according to the present invention.

First, as shown in FIG. 4, in the finishing tool 100 according to the present invention, a connection base 102 has the same thickness (t) as the base 12 and has at least two acceptance openings 102' formed through cutaway along the cable direction of the cable mold 10. The connection base 102 further includes a coupling step jaw 101, an adhesive tape 105, and a joint opening 107.

The coupling step jaws 101 are protruded and formed at both sides of the acceptance opening 102' and are coupled with a finishing groove 104' of a connection cover 104 to be described later, thus forming a mold coupling opening 103. The adhesive tape 105 is provided at a bottom surface of the connection base 102 to attach and fix the connection base 102 to the ground or a wall surface.

The joint opening 107 is through formed at a center of the connection base 102 to fix the connection base 102 to the ground or wall surface by a fixer (not shown) such as a bolt and the like and is provided for more firm fixation and not to release from the ground or a wall surface against even an external strong impact.

The acceptance opening 102' is a technological means for safely mounting the base 12 of the cable mold 10, thereby enabling more clean acceptance to the finishing tool 100 and finishing arrangement.

This is because the connection base 102 having the acceptance opening 102' has the same thickness (t) as the base 12 of the cable mold 10.

The connection cover 104 is coupled to an upper side of the connection base 102. The finishing groove 104' corresponding to an outer shape of the cover 14 of the cable mold 10 is formed in a position corresponding to the acceptance opening 102'. The acceptance opening 102' and the finishing groove 104' form the mold coupling opening 103 and finish a connection formed by ends of at least two cable molds 10.

The finishing groove 104' is shown in a circular arc shape in the present invention but this does not intend to limit the scope of the invention. It would be within the scope of any possible modifications and variations by those skilled in the art that the finishing groove 104' can be manufactured to correspond to various shapes such as a cable mold shape and the like shown in FIG. 1B.

The coupler 106 is provided in plurality at an upper side of the connection base 102 and a lower side of the connection cover 104, in detail, at an upper side of the coupling step jaw 101 of the connection base 102 and a lower side of the connection cover 104 corresponding to the upper side of the coupling step jaw 101, respectively. The coupler 106 couples the connection base 102 with the connection cover 104.

As shown, the coupler 106 is realized by a combination of a coupling protrusion and coupling groove or a catching hook and catching groove that each are provided at an upper side of the coupling step jaw 101 and a lower side of the finishing groove 104'. Besides this, various coupling methods can be considered undoubtedly.

Figure 5:
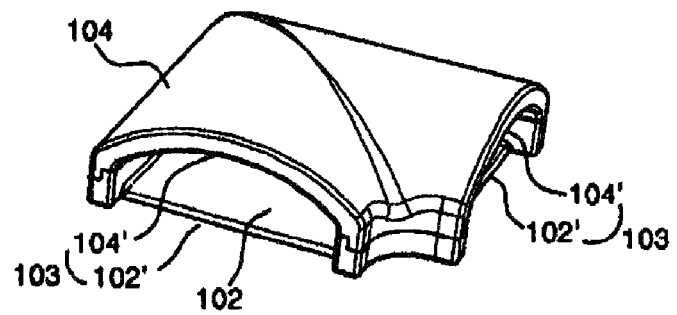
Figure 5:
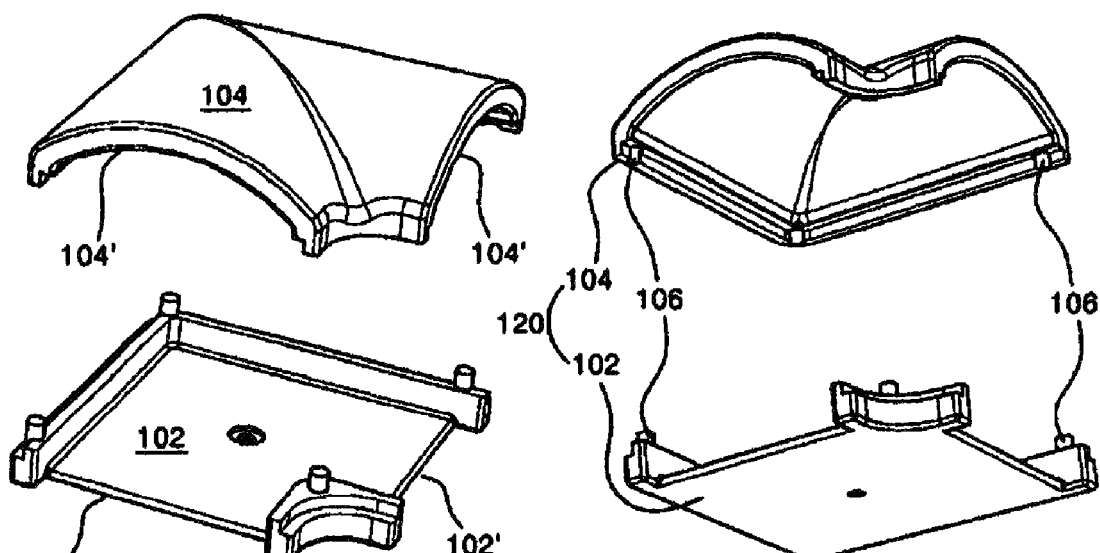
Figure 6:
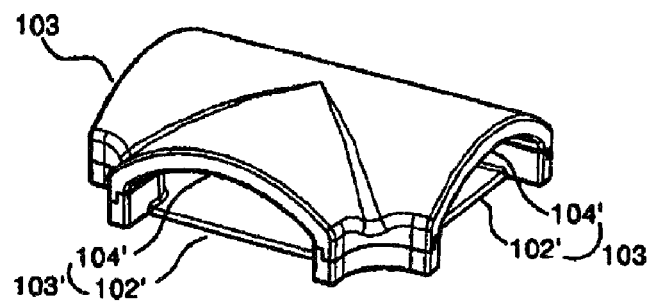
Figure 6:
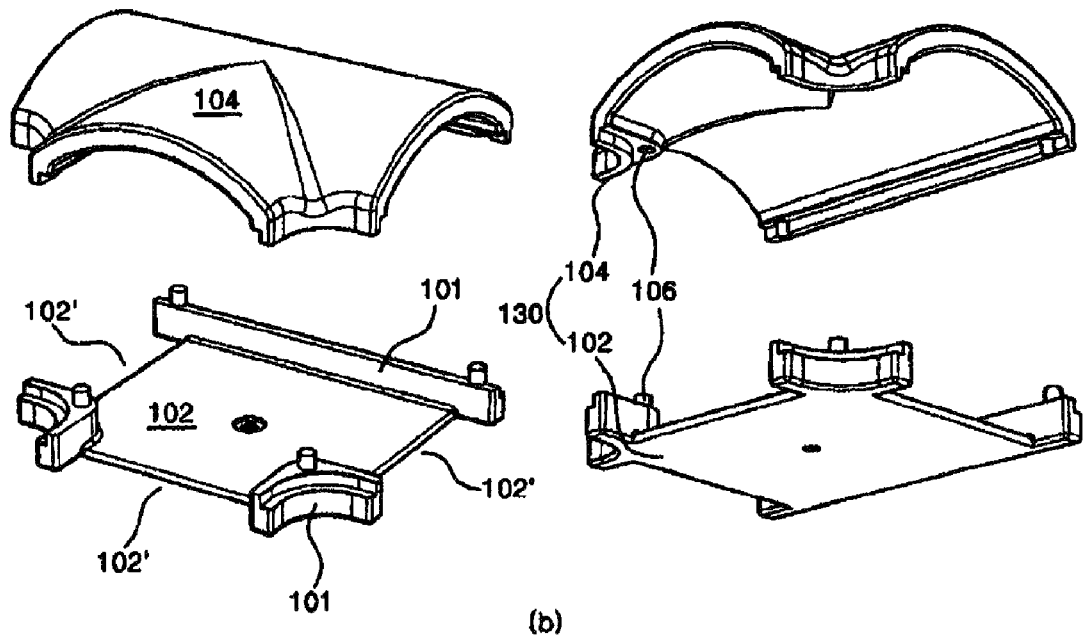
Figure 7:
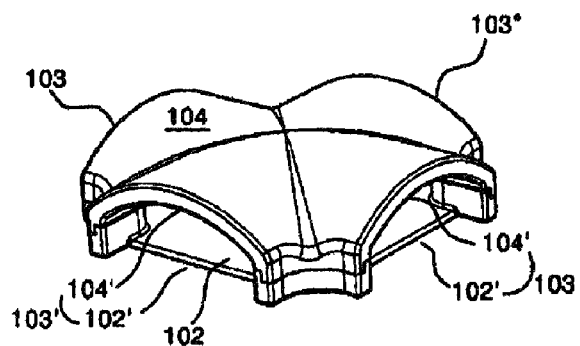
Figure 7:
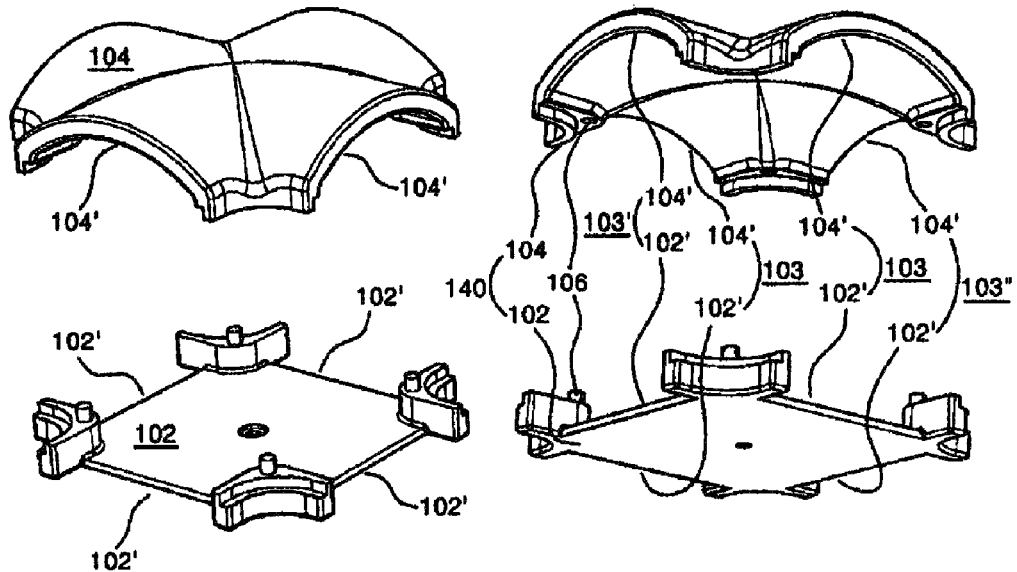

As above, a finishing tool for a cable mold connection according to the present invention can apply various exemplary embodiments and can apply exemplary embodiments such as a square two-way finishing tool 120, a three-way finishing tool 130, a four-way finishing tool 140 and the like as each shown in FIGS. 5 to 7 as well as a straight two-way finishing tool 110 having a mold coupling opening 103 formed on a straight line as shown in FIG. 4.

As shown in FIG. 4, the straight two-way finishing tool 110 is coupled to a region where two ends of the cable molds 10 adjacent on the ground or a wall surface face in a straight line form. The acceptance openings 102' each are formed at both ends of the connection base 102 and the mold coupling openings 103 are formed on a straight line, thus serving to connect the cable molds with each other in '⌞__⌟,' or " ] " shapes.

As shown in FIG. 5, the square two-way finishing tool 120 is coupled to a region where two ends of the cable molds 10 (referring to FIG. 4 below) adjacent on the ground or a wall surface meet at right angles. The acceptance opening 102' is formed in the square direction of the connection base 102 and the mold coupling opening 103 is formed in the square direction, thus serving to connect the cable molds with each other in a ' ⌈¯¯⌉', "¯¯⌉',  ' ⌊__⌋', or "⌊__" shape.

As shown in FIG. 6, the three-way finishing tool 130 is coupled to a region where three ends of the cable molds 10 adjacent to the ground or a wall surface meet at right angles with each other. The three-way finishing tool 130 further includes a branch mold coupling opening 103' along a square direction of the mold coupling opening 103 of both sides of the straight two-way finishing tool 110, thus serving to coupling the cable molds with each other in a ' ⊢ ', 'T', ' ⊣ ', or ' ⊥ 'shape.

As shown in FIG. 7, the four-way finishing tool 140 is coupled to a region where four ends of the cable molds 10 adjacent on the ground or a wall surface meet at right angles with each other. The four-way finishing tool 140 further includes a branch mold coupling opening 103" facing the branch mold coupling openings 103' of the three-way finishing tool 130, thus serving to connect the cable molds with each other in a '+' shape.

Figure 8:
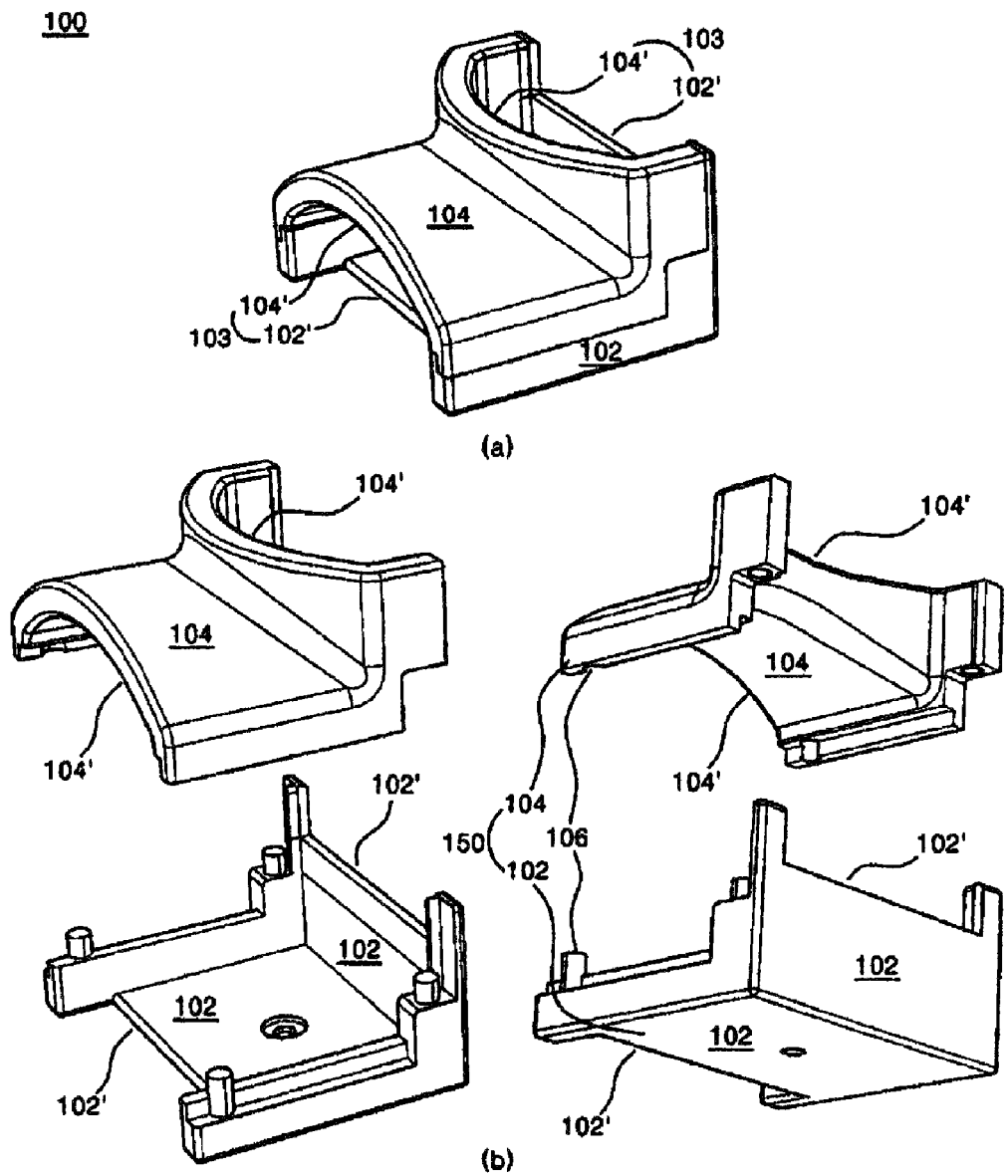
Figure 9:
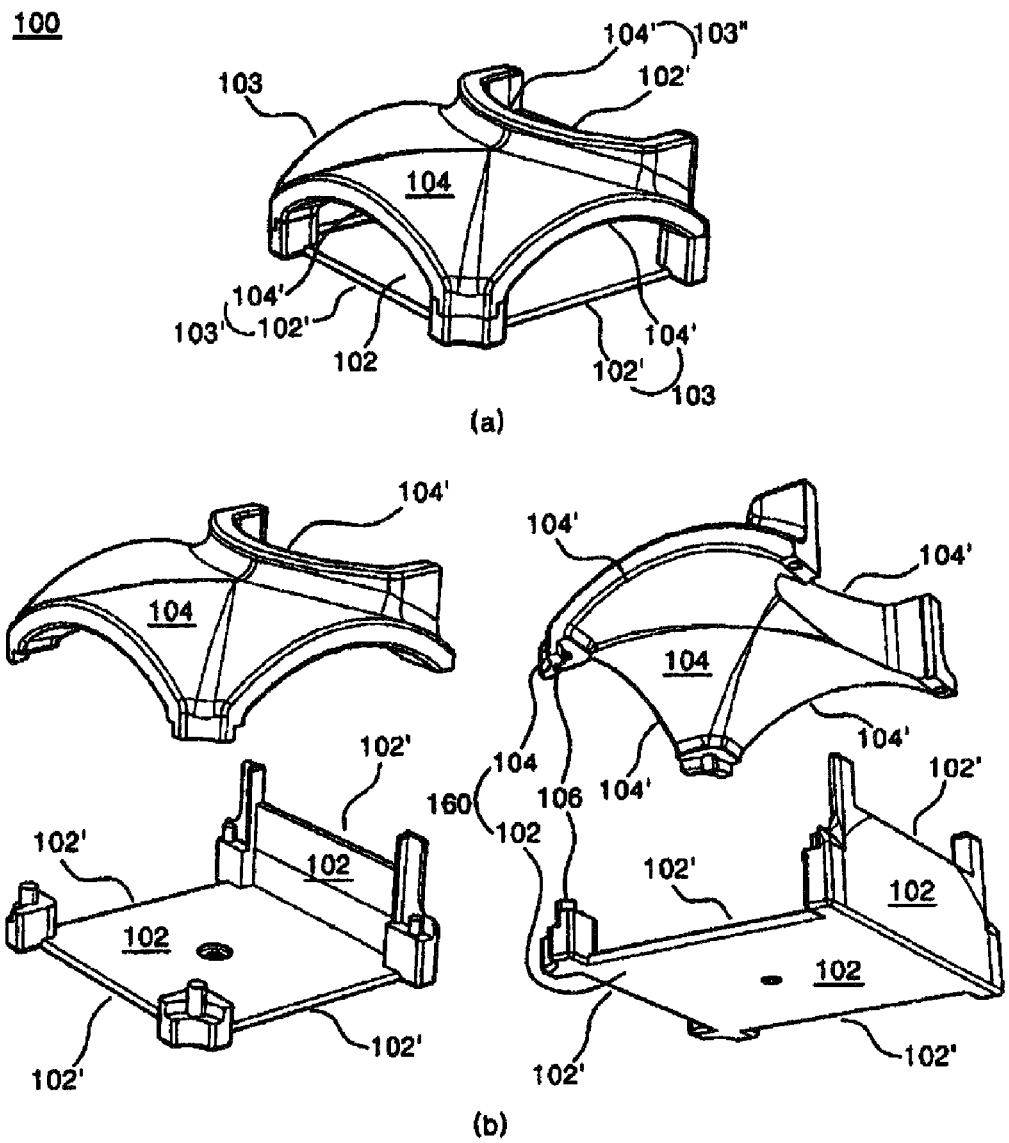

In addition to this, as shown in FIGS. 8 and 9, a finishing tool for a cable mold connection according to the present invention can also undoubtedly apply an exemplary embodiment such as a face-to-face square two-way finishing tool 150, a face-to-face multiple square two-way finishing tool 160 and the like as a finishing tool 100 for connecting respective ends of cable molds 10 for protecting a cable connected from the ground to a wall surface or vice versa with each other.

As shown in FIG. 8, the face-to-face square two-way finishing tool 150 is coupled to a region where two ends of the cable molds 10 each attached and adjacent to the ground or a wall surface meet at right angles with each other. The face-to-face square two-way finishing tool 150 can perform finishing through square bending a straight two-way finishing tool 110, in detail, square bending a connection base 102 and connection cover 104 such that the mold coupling openings 103 formed by the acceptance openings 102' and the finishing grooves 104' meet at right angles with each other.

As shown in FIG. 9, the face-to-face multiple square two-way finishing tool 160 finishes and couples a region where an end of at least one cable mold 10 attached to the ground connects with an end of at least one cable mold 10 attached to a wall surface, by square bending any one of regions where the mold coupling openings 103 and branch mold coupling openings 103' and 103" of the four-way finishing tool 140 are formed such that any one of the respective mold coupling openings 103, 103, 103', and 103" meets at right angles with the remaining three ones.

The finishing tools 110, 120, 130, 140, 150, and 160 constructed above according to the present invention all include adhesive tapes 105 (shown for convenience in FIG. 4 only) at lower surfaces of connection bases 102 and joint openings 107 at centers of the connection bases 102.

The face-to-face square two-way finishing tool 150 and the face-to-face multiple square two-way finishing tool 160 can include all the adhesive tapes 105 and joint openings 107 at wall contacts or ground contacts among bent surfaces of the connection bases 102 or can selectively include only at one side.

Figure 10:
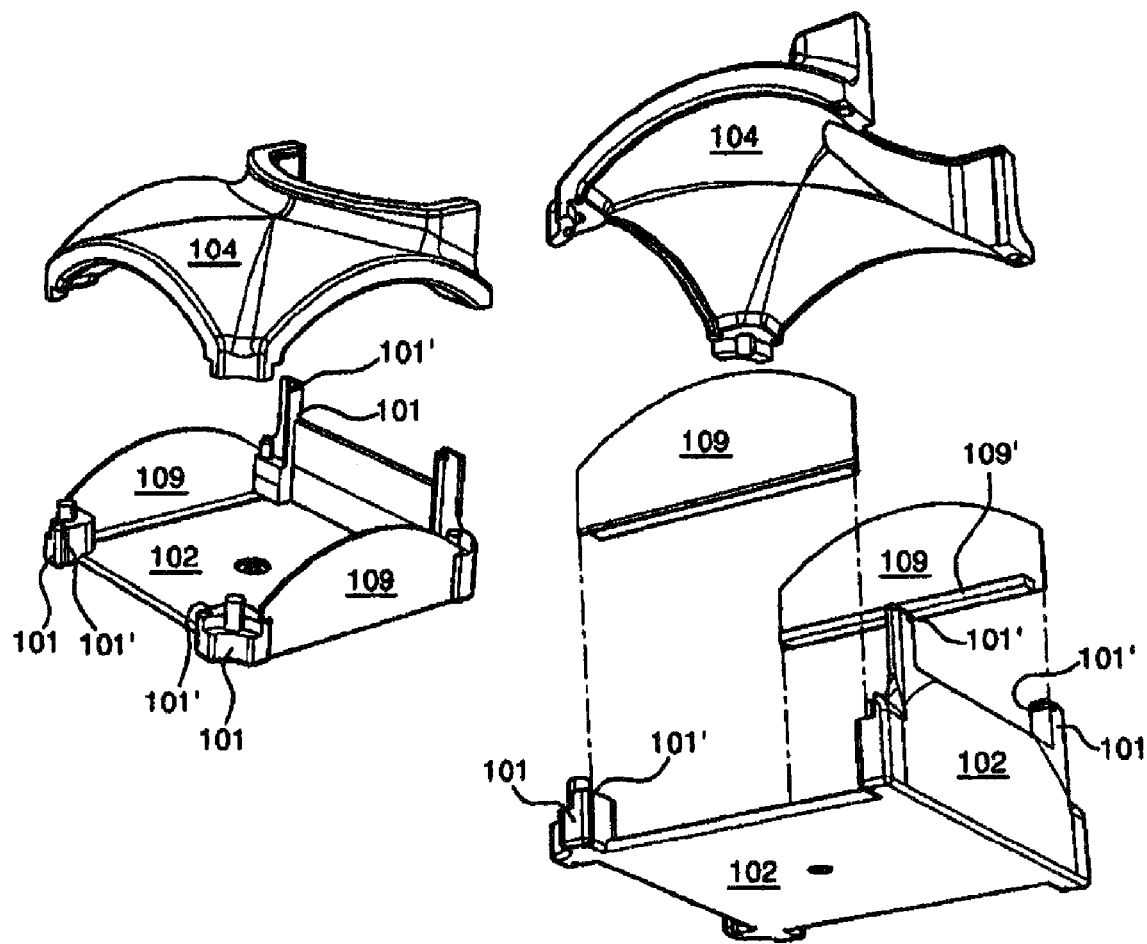
FIG. 10 is a perspective diagram and exploded perspective diagram illustrating a state of coupling between a finishing tool for a cable mold connection and a finishing cover according to the present invention.

As shown in FIG. 10, the finishing tools 110, 120, 130, 140, 150, and 160 according to the present invention can all further include finishing covers 109 mounted corresponding in shape to the mold coupling opening 103 or branch mold coupling openings 103' and 103", respectively, to finish an unused one of the respective mold coupling openings 103, 103', and 103".

In the present invention, as shown in FIG. 10, the finishing cover 109 is shown only for the face-to-face multiple square two-way finishing tool 160 but this does not intend to limit the scope of the invention as above. The finishing cover 109 is fitted and coupled to slide grooves 101' each formed at coupling step jaws 101 of each of the finishing tools 110, 120, 130, 140, 150, and 160 and facing each other, thus being capable of seeking clean finishing of an unused opening.

Desirably, the finishing cover 109 further includes a finishing block 109' for finishing the acceptance opening 102' with a thickness and width corresponding to the acceptance opening 102' to prevent the introduction of dusts or foreign materials into an internal space formed by the connection base 102 and connection cover 104.

Figure 11:
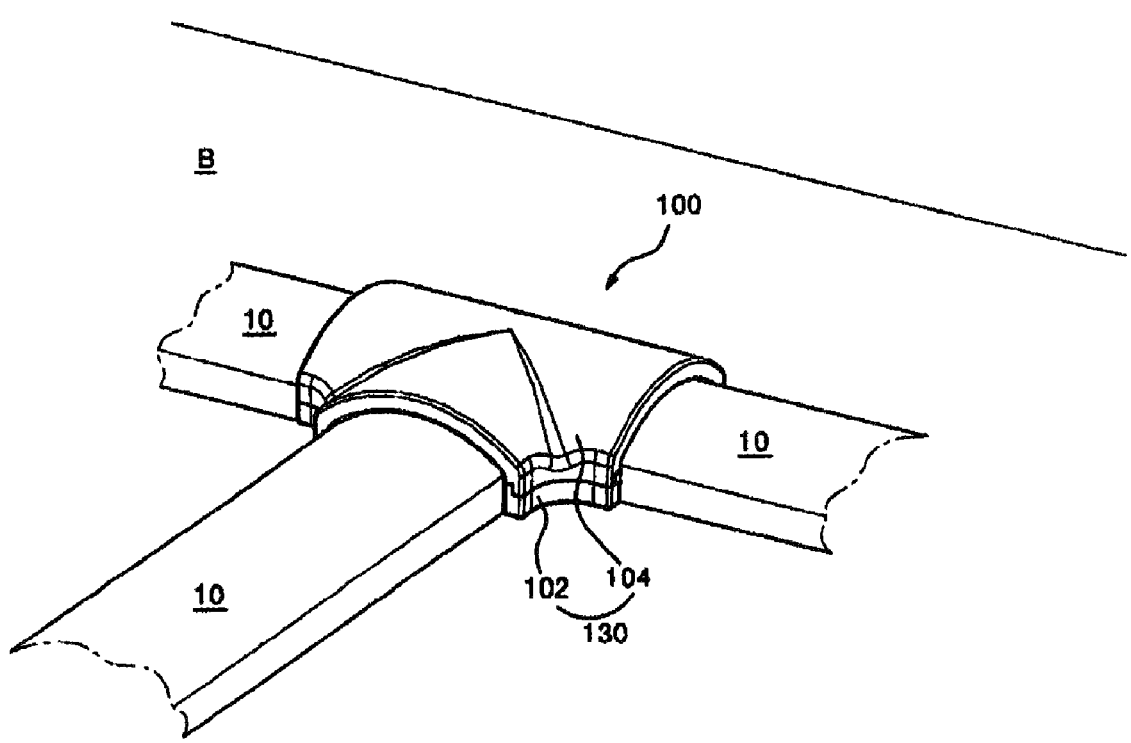
FIGS. 11 and 12 are perspective diagrams illustrating finishing tools applied to cable mold connections according to exemplary embodiments of the present invention.
Figure 12:
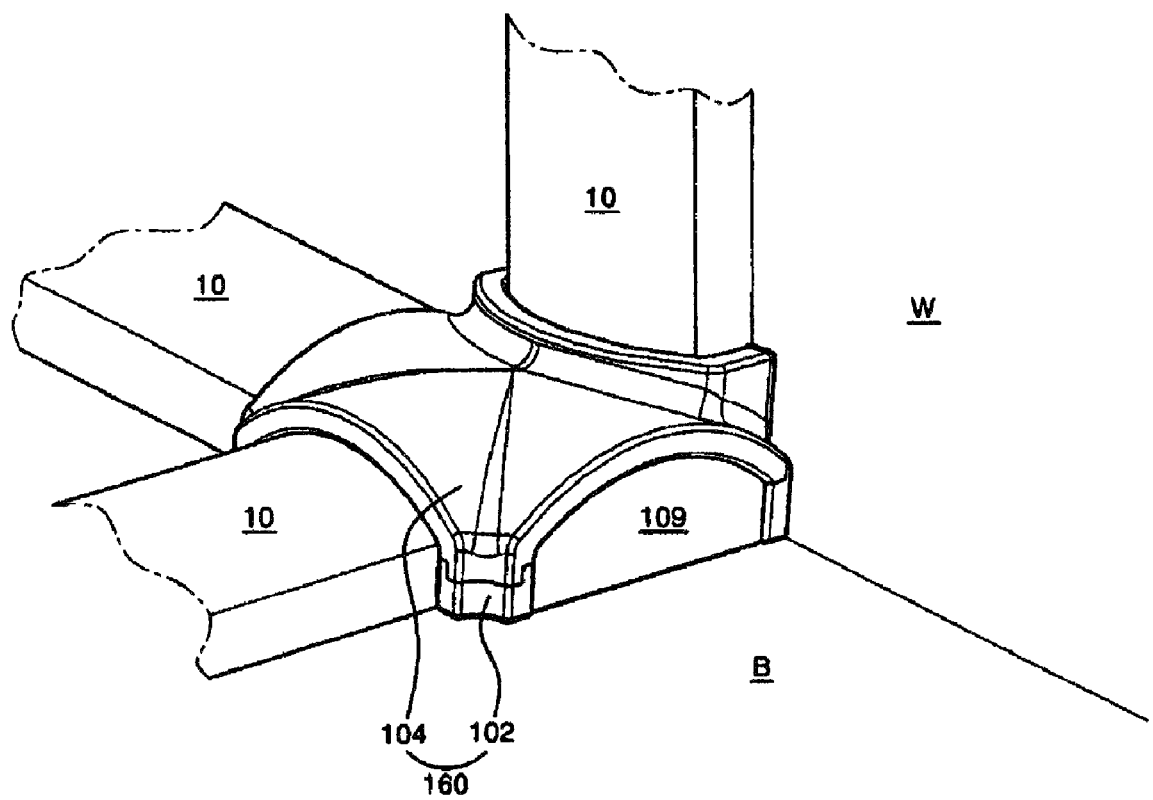

An exemplary embodiment where the above-constructed finishing tool for the cable mold connection according to the present invention is actually coupled for finishing to a region where ends of cable molds 10 are adjacent is described in brief with reference to FIGS. 11 and 12.

Non-described symbols of FIGS. 11 and 12 refer to FIGS. 4 to 10. Other than the three-way finishing tool 130 and face-to-face multiple square two-way finishing tool 160 are the same and thus, their descriptions are omitted.

First, as shown in FIG. 11, a finishing tool 100 according to the present invention, in detail, a three-way finishing tool 130 can safely mount each end of the cable mold 10 in an acceptance opening 102' of a connection base 102, and finish and construct, by a connection cover 104, a region where three ends of the cable molds 10 adjacent on the ground (B) meet at right angles with each other.

As shown in FIG. 12, a finishing tool 100 according to the present invention, in detail, a face-to-face multiple square two-way finishing tool 160 can perform finishing and construction through mutual coupling between a connection base 102 and a connection cover 104 at a region where a cable mold 10 attached on a wall surface (W) meets at right angles with two ends of cable molds 10 that connect on the ground (B) and meet at right angles with each other.

For clean finishing, a finishing cover 109 is installed in a mold coupling opening 103 that is an unused one of the respective mold coupling openings 103, 103, 103', and 103" of the face-to-face multiple square two-way finishing tool 160.

A process of constructing the above-constructed finishing tool for the cable mold connection according to the present invention is described below. For description convenience, a straight two-way finishing tool 110 is described for example.

First, a user recognizes a position of a cable mold 10 disposed and fixes a connection base 102 to the ground (B) in a position where two ends of cable molds 10 are adjacent, with an adhesive tape 105 provided at a bottom surface of the connection base 102 of a finishing tool 100, that is, the straight two-way finishing tool 110. Then, the user firmly fixes and couples the connection base 102 to the ground (B) with a fixer such as a nail or a bolt and the like through a joint opening 107 provided at a center of the connection base 102.

Then, the user safely mounts each end of the cable mold 10 correspondingly in an acceptance opening 102' of the connection base 102, fixes a base 12 of the cable mold 10 with an adhesive tape (not shown) provided at a bottom surface of the base 12, disposes a cable (not shown) in the base 12, and performs finishing by a cover 14.

Finally, the user completes a construction in such a manner that couplers 106 are coupled with each other at an upper side of the connection base 102 of the straight two-way finishing tool 110 set above, in detail, at an upper side of a coupling step jaw 101 and a lower side of a finishing groove 104' of the connection cover 104 and the connection cover 104 finishes the upper side of the connection base 102.

As described above, it can be understood that the present invention is based on a basic technological sprit of providing a finishing tool for a cable mold connection for making more firm and clean arrangement of a cable and a cable mold possible and in addition, simply, conveniently, and promptly executing a series of construction inclusive of attachment and installation irrespective of proficiency.

According to the present invention having the above construction, the following effects can be expected.

First, unlike the conventional art having the limitations of not being able to make use corresponding to other than a specified cable mold shape, the troublesomeness of a process of processing and constructing a finishing tool, and the complexity and weakness of a finishing part to an external impact, there is a feature and advantage of making clean finishing and arrangement of a cable and cable mold possible by adopting a construction of a connection base including mold coupling openings comprised of finishing grooves of various shapes corresponding to an outer shape of a cable mold cover and including an acceptance opening for safely mounting a base of the cable mold.

Also, the present invention has an advantage of enabling more firm fixation and coupling by coupling between a fixer and a wall surface or the ground through an adhesive tape of a bottom surface of a connection base and a joint opening of a center thereof, thus preventing a release from the wall surface or ground against even an external strong impact.

Also, the present invention has an advantage of being able to prevent the introduction of foreign materials or dusts from the external and safely protect a built-in cable by adopting a construction for finishing each unused coupling opening with a finishing cover.

Also, the present invention has a great usefulness such as a feature and advantage of being capable of reducing an amount of use of an unnecessary cable mold and making simple and convenient construction execution possible irrespective of proficiency by adopting a construction of a finishing tool for finishing and constructing a plurality of cables directing from a wall surface to the ground or vice versa.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A finishing tool for a cable mold connection, for connecting a plurality of cable molds with each other, each of the cable molds having a base for mounting a cable and attached to a ground or a wall surface and a cover for protecting the cable,
wherein the finishing tool comprises:
a connection base having a thickness corresponding to one of the base of the cable molds, the connection base including a plurality of coupling step jaws protruding from at least two sides of the connection base and having at least two openings between the connection base and the coupling step jaws, each of the openings disposed in a cable extending direction of one of the cable molds;
a connection cover coupled to an upper side of the connection base, and forming at least one mold coupling openings corresponding to an outer shape of one of the covers of the cable molds for finishing a connection with the corresponding end of one of the cable molds; and
a plurality of couplers each provided at an upper side of the connection base and a lower side of the connection cover for coupling the connection base and the connection cover with each other, and
wherein the base of one of the cable molds is mounted in one of the openings of the connection base.

2. The tool of claim 1, wherein the connection base further comprises:
an adhesive tape provided at a bottom surface of the connection base for attaching to the ground or the wall surface; and
a joint opening formed in the connection base to fix the connection base to the ground or the wall surface with a fastener.

3. The tool of claim 2, wherein each of the couplers comprises a coupling protrusion and coupling groove or a catching hook and catching groove each provided at an upper side of the coupling step jaws and a lower side of the connection cover.

4. The tool of claim 2, wherein an unused one of the mold coupling openings is covered by a finishing cover.

5. The tool of claim 1, wherein the finishing tool has a configuration selected from the group consisting of a straight two-way finishing tool, a square two-way finishing tool, a three-way finishing tool, and a four-way finishing tool, and finishes the connection of the corresponding end of one of the cable molds in the cable extending direction of one of the cable molds.

6. The tool of claim 5, wherein the finishing tool has a configuration selected from the group consisting of a face-to-face square two-way finishing tool and a face-to-face multiple square two-way finishing tool, and finishes the connection of the corresponding end of one of the cable molds in the cable extending direction of one of the cable molds.

7. The tool of claim 6, wherein the finishing tool has the face-to-face square two-way finishing tool configuration, and is coupled to a region where two ends of the cable molds meet at right angles with each other, and has the mold coupling openings arranged at right angles with each other.

8. The tool of claim 6, wherein the finishing tool has the face-to-face multiple square two-way finishing tool configuration, and is coupled to a region where an end of the at least one cable molds attached to the ground connects with an end of the at least one cable molds attached to the wall surface, and has the mold coupling openings arranged at right angles with each other.

9. The tool of claim 1, wherein an unused one of the mold coupling openings is covered by a finishing cover.

10. The tool of claim 9, wherein the finishing cover is fitted and coupled to slide grooves each formed at the coupling step jaws.

11. The tool of claim 5, wherein the finishing tool has the straight two-way finishing tool configuration, and is coupled to a region where two ends of the cable molds face in a straight line form, has the openings formed at both ends of the connection base, and has the mold coupling openings formed in a linear shape.

12. The tool of claim 5, wherein the finishing tool has the square two-way finishing tool configuration, and is coupled to a region where two ends of the cable molds meet at right angles, has the openings formed in a square direction of the connection base, and has the mold-coupling openings formed in a square direction.

13. The tool of claim 5, wherein the finishing tool has the three-way finishing tool configuration, and is coupled to a region where three ends of the cable molds meet at right angles with each other.

14. The tool of claim 5, wherein the finishing tool has the four-way finishing tool configuration, and is coupled to a region where four ends of the cable molds meet at right angles with each other.

* * * * *